(12) United States Patent
Lepine et al.

(10) Patent No.: US 10,094,440 B2
(45) Date of Patent: Oct. 9, 2018

(54) SUSPENSION THRUST BEARING DEVICE

(71) Applicant: Aktiebolaget SKF, Gothenburg (SE)

(72) Inventors: Thomas Lepine, Villandry (FR); Charles Bedeau, Tours (FR); Cedric Brouty, Rouziers de Touraine (FR); Jean-Marc Soudee, Chambray-les-Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 1 day.

(21) Appl. No.: 15/409,951

(22) Filed: Jan. 19, 2017

(65) Prior Publication Data

US 2017/0219038 A1 Aug. 3, 2017

(30) Foreign Application Priority Data

Jan. 28, 2016 (EP) .................................. 16153214

(51) Int. Cl.
*F16C 19/10* (2006.01)
*F16F 1/37* (2006.01)
*B60G 15/06* (2006.01)
*F16C 33/30* (2006.01)
*B60G 11/52* (2006.01)

(52) U.S. Cl.
CPC ................ *F16F 1/37* (2013.01); *B60G 11/52* (2013.01); *B60G 15/067* (2013.01); *F16C 33/30* (2013.01); *B60G 2204/124* (2013.01); *B60G 2204/418* (2013.01); *F16C 2326/05* (2013.01); *F16F 2224/0225* (2013.01); *F16F 2234/02* (2013.01)

(58) Field of Classification Search
CPC ......... F16C 19/10; F16C 2326/05; F16F 1/37; F16F 2224/0225; B50G 15/067; B50G 2204/124; B50G 2204/1242; B50G 2204/418
See application file for complete search history.

(56) References Cited

U.S. PATENT DOCUMENTS 2,811,396 A 9/1970 Nelson
3,754,746 A * 8/1973 Thiele ...................... F16F 7/12
188/268

(Continued)

FOREIGN PATENT DOCUMENTS

DE 2419679 A1 * 11/1975 ................ B60P 7/16
DE 102012215911 A1 * 3/2014 ............. F16C 19/10

(Continued)

*Primary Examiner* — Phillip A Johnson
(74) *Attorney, Agent, or Firm* — Bryan Peckjian; SKF USA Inc. Patent Dept.

(57) ABSTRACT

The invention concerns a suspension thrust bearing for use with a suspension spring in an automotive suspension strut. The suspension thrust bearing provides a bearing with an annular upper part and a annular lower part in relative rotation one to the other, a lower support surface being provided by the lower part that axially supports an upper end of a suspension spring by the intermediate of a damping device made from resilient material. The resilient material of the damping device is molten in its preformed state with gas. After being molded, the molten material of the damping device provides an outer skinny layer and an inner foam body, the density of the outer skinny layer being strictly greater than the density of the inner foam body.

7 Claims, 1 Drawing Sheet

(56) References Cited

U.S. PATENT DOCUMENTS

| | | | |
|---|---|---|---|
| 4,566,812 A * | 1/1986 | Takei | B60G 15/068 |
| | | | 384/484 |
| 2003/0002764 A1 * | 1/2003 | Pflugner | B60G 15/00 |
| | | | 384/609 |
| 2005/0279910 A1 * | 12/2005 | Huprikar | F16F 1/37 |
| | | | 248/636 |
| 2008/0012263 A1 | 1/2008 | Dickson et al. | |
| 2008/0258328 A1 | 10/2008 | Hansen et al. | |
| 2010/0014792 A1 | 1/2010 | Kellam | |
| 2012/0234995 A1 | 9/2012 | Dietert | |

FOREIGN PATENT DOCUMENTS

| | | | |
|---|---|---|---|
| EP | 2152531 | 7/2011 | |
| FR | 2658129 A1 * | 8/1991 | B60G 11/54 |

* cited by examiner

SUSPENSION THRUST BEARING DEVICE

CROSS REFERENCE TO RELATED APPLICATIONS

This application claims priority to European patent application no. 16153214.8 filed on Jan. 28, 2016, the contents of which are fully incorporated herein by reference.

FIELD OF THE INVENTION

The present invention concerns the field of suspension thrust bearings, in particular of the MacPherson type. Such suspension thrust bearings equip suspension strut for use in a motor vehicle.

BACKGROUND OF THE INVENTION

As a general rule, a motor vehicle suspension system provides a suspension strut supporting an axle and a vehicle wheel. A suspension thrust bearing is disposed in an upper portion of the suspension strut, opposite to the wheel and the ground, and between a suspension spring and an upper support block attached to the body of the vehicle.

The suspension thrust bearing includes at least one rolling bearing.

The suspension thrust bearing enables transmission of axial forces between the spring and the body of the vehicle and, in the meantime, allows relative angular movement between the spring, which is mobile in rotation, and the fixed support block attached to the body.

To this end, the spring is supported by a spring seat provided on the suspension thrust bearing. More precisely, the suspension thrust bearing provides a lower support surface resting on ending coils of the spring. The spring support surface provides a radial surface to support axial force. The spring support surface may also provide a tubular axial surface to support radial deformations and to ensure the spring centering.

It is known from US 2010/0014792 A1 and EP 2 152 531 B1 to provide a damping device axially and radially disposed between the spring and the spring support surface of the suspension thrust bearing. As shown in these documents, the damping device is attached to the lower surface of the suspension thrust bearing. Damping device is made from a resilient material, such as thermoplastic elastomer (TPE), molten processable elastomer (MPE) or thermoplastic polyurethane (TPU).

However, a compromise has to be found in the material mechanical properties. Indeed, the damping device must be rigid enough to support axial loads and must be soft enough to damp vibrations from the spring. These two objectives are not compatible with standard materials.

BRIEF SUMMARY OF THE INVENTION

The aim of the invention is to provide a suspension thrust bearing with an improved damping device having optimized performances for both load support and damping functions.

It is another object of the invention to allow an easy and economic manufacturing process of such suspension thrust bearing.

To this end, the invention concerns a suspension thrust bearing for use with a suspension spring in an automotive suspension strut. The suspension thrust bearing provides a bearing with upper and lower annular parts in relative rotation one to the other. The lower annular part provides a lower support surface that axially supports an upper end of a suspension spring by the intermediate of a damping device made from resilient material.

According to the invention, the resilient material of the damping device is molten in its preformed state with gas. After being molded, the molten material of the damping device provides an outer skinny layer and an inner foam body, the density of the outer skinny layer being strictly greater than the density of the inner foam body.

Thanks to the invention, the outer surface of the damping material is of higher density, and then rigid enough to support the load directly exerted by the coil spring. The load distribution is also more uniform over the annular damping device support surface.

On the other side, the inner body of the damping resilient material is of lower density, and then soft enough to ensure an optimized vibration damping.

There is no compromise to characterize the damping device material between the load support and the vibration damping. Both functions are performed in an optimized way.

According to further aspects of the invention which are advantageous but not compulsory, such a suspension thrust bearing may incorporate one or several of the following features:

The suspension thrust bearing provides a bearing with an inner ring fixed to an upper cap, so as to form the upper annular part of the suspension thrust bearing, and an outer ring fixed to a lower cap, so as to form the lower annular part of the suspension thrust bearing.

The inner and outer rings are made from a stamped metal sheet.

The upper and lower caps are made from a rigid plastic material.

The upper and/or lower caps may provide stiffening insert.

The bearing consists in a rolling bearing, the inner and outer rings defining an annular rolling chamber between them and at least one row of rolling elements being disposed within the rolling chamber.

The rolling elements are balls.

The lower part provides an axial hub and an outwardly projected radial flange extending from the hub.

A damping device is provided by an outer cylindrical surface of the hub so as to support radial load from the suspension spring.

A damping device is provided by a lower radial surface of the outwardly projected radial flange so as to support axial load from the suspension spring.

The density of the outer skinny layer is provided between 1 and 1.5, advantageously equal to 1.1.

The density of the inner foam body is provided between 0.4 and 1, advantageously equal to 0.8.

The resilient material of the damping device is molten in its preformed state with a material being expandable under heat treatment.

The expandable material consists in a plurality of spheres comprising each a shell and a gas encapsulated within the shell, the gas internal pressure increasing under heat treatment and the shell being then plastically deformed.

The resilient material of the damping device is molten in its preformed state directly with injected gas.

The gas may be butane or octane.

The damping device is directly molded on the lower part.

The damping device is made from a resilient material, such as rubber, thermoplastic elastomer (TPE), in particular thermoplastic polyurethane (TPU), molten processable elastomer (MPE) or cellular polyurethane.

BRIEF DESCRIPTION OF THE SEVERAL VIEWS OF THE DRAWING

The invention will now be explained in correspondence with the annexed figures, as an illustrative example, without restricting the object of the invention. In the annexed figures.

DETAILED DESCRIPTION OF THE INVENTION

Figure 1:
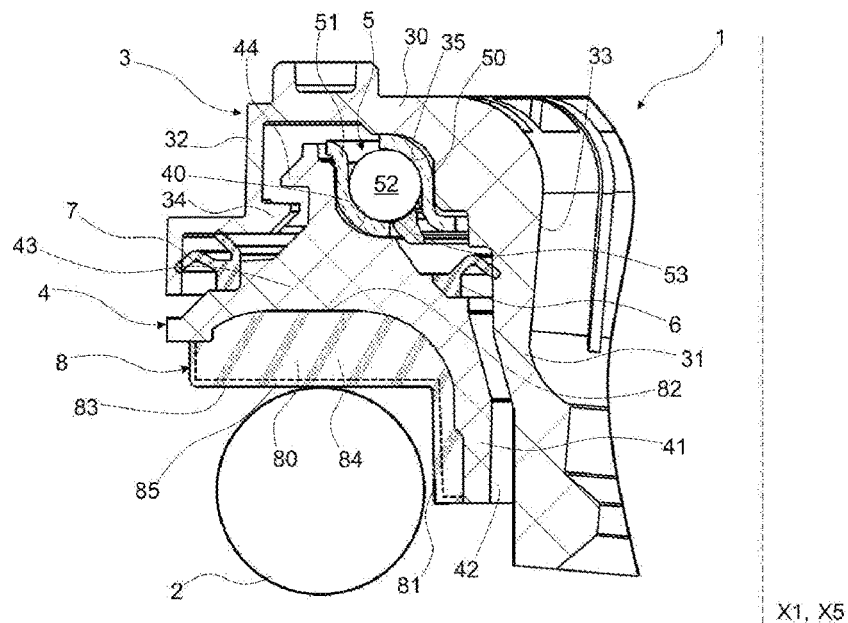
FIG. 1 is a sectional view of a suspension thrust bearing.

A suspension thrust bearing 1 with central axis X1 is mounted between a coil spring 2 and a support block (not shown) connected to the chassis of a motor vehicle. Such suspension thrust bearing 1 can be used, for example, in an automotive MacPherson strut assembly.

Hereinafter, the adjectives "axial" and "radial" are defined relative to the central axis X1 of the annular thrust bearing 1.

The suspension thrust bearing 1 provides an upper cap 3, a lower cap 4 and a single rolling bearing 5. These three components 3, 4 and 5 are of globally circular shape about a central axis X5 coinciding with the central axis X1 when the suspension thrust bearing 1 is not loaded.

The upper cap 3 consists in a one-piece part made from plastic synthetic material, for example from polyamide, optionally reinforced with glass fibers. The upper cap 3 has an upper radial portion 30, an inner annular skirt 31 of relatively small diameter and extending towards the lower side of the suspension thrust bearing 1, and an outer annular skirt 32 of relatively large diameter and extending towards the lower side of the suspension thrust bearing 1.

The inner skirt 31 defines an inner bore 33 for the suspension thrust device 1 wherein an elongate shock absorber rod (not shown) is mounted.

The outer skirt 32 includes a hook 34 that may be continuous or discontinuous in the circumferential direction, taking the form of an axial projection directed towards the interior side of the suspension thrust bearing 1.

The upper cap 3 is dedicated to be fixed to a support block of the automotive vehicle chassis.

The rolling bearing 5 provides a pressed sheet metal inner race 50, an outer race 51 also of pressed sheet metal, a row of rolling elements 52, here balls, and a cage 53 for maintaining a regular circumferential spacing between the rolling elements 52. The rolling elements 52 are disposed between raceways formed by toroidal portions of the inner race 50 and outer race 51.

As an alternative not shown, no rolling elements need to be used but rather the inner and outer races may directly contact each other, with a suitable low friction material, coating, or lubricant being used.

The rolling bearing 5 is integrally radially located between the inner skirt 31 and the outer skirt 32 of the upper cap 3. The inner race 50 is fitted within a toroidal inner portion 35 of the upper cap 3

The outer race 51 is fitted onto a toroidal outer portion 40 of the lower cap 4.

The lower cap 4 provides a hub 41 defining an inner bore 42 wherein the inner skirt 31 of the upper cap 3 axially extends. The lower cap 4 further provides an outwardly projecting radial flange 43 that extends from the hub 41 towards the exterior of the suspension thrust bearing 1.

The toroidal outer portion 40 supporting the outer race 51 of the rolling bearing 51 is provided on an upper surface of the radial flange 43.

The lower cap 4 includes a radial protrusion 44 so as to cooperate with the hook 34 of the upper cap 3 to guarantee axial retention of the upper cap 3 with the lower cap 4 between which the rolling bearing 5 is clamped.

According to the embodiment, the lower cap 4 further provides a damping device 8 made from a resilient material.

The damping device is made from a resilient material, such as rubber, thermoplastic elastomer (TPE), in particular thermoplastic polyurethane (TPU), molten processible elastomer (MPE) or cellular polyurethane for example.

The damping device 8 provides a radial portion 80 and a tubular axial portion 81. The radial portion 80 provides an upper side 82 tightly fastened to the lower side of the radial flange 43 of the lower part 4. The radial portion 80 provides a lower radial side 83 for receiving an end turn of the suspension spring 2 in bearing contact.

The radial portion 80 of the damping device 8 supports axial load and shocks from the suspension spring 2.

The tubular axial portion 81 axially extends from the radial portion 80 towards the lower side of the suspension thrust bearing 1. The tubular axial portion 81 is tightly fastened to an outer cylindrical surface of the hub 41 of the lower cap 4.

The tubular axial portion 81 of the damping device 8 supports radial load and shocks from the suspension spring 2.

According to the invention, the resilient material of the damping device 8 provides an outer skinny layer 85 and an inner foam body 84, the density of the outer skinny layer 85 being strictly greater than the density of the inner foam body 84.

Figure 2:
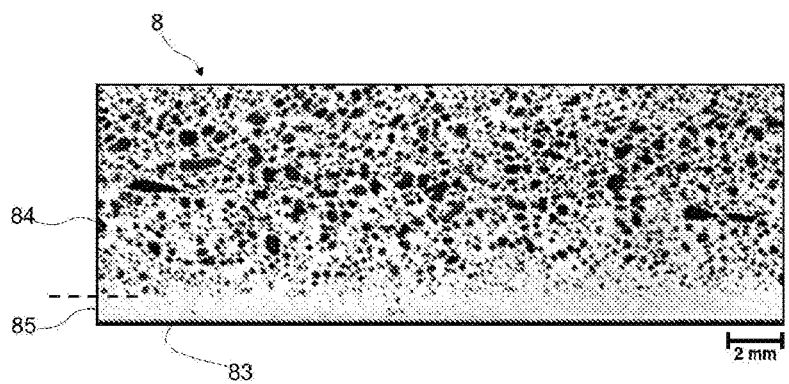
FIG. 2 is a microscopic sectional view of a material forming a damping device according to the invention.

For sake of clarity, the transition between the outer skinny layer 85 and the inner foam body 84 is schematically displayed by a dashed line in FIG. 1. The microscopic photography of FIG. 2 shows the visual difference between the skinny layer 85 and foam body 84.

The density of the outer skinny layer is provided between 1 and 1.5, advantageously equal to 1.1. The density of the inner foam body is provided between 0.4 and 1, advantageously equal to 0.8.

Thanks to the invention, the suspension spring 2 is in contact with the outer skinny layer 85 of the damping device 8, ie. is supported by the portion of higher density of the damping means 8. The exerted radial and/or axial load is uniformly distributed over the damping means.

The inner foam body 84 of the damping means is softer than the outer layer and then is able to efficiently damp vibrations and shocks.

For obtaining such a resilient material with different density phases, the resilient material of the damping device 8 is molten in its preformed state with gas, for example butane or octane. The molten material is then molded directly or not so as to form the damping device 8.

During the molding process, the injected gas creates cavities within the damping device material. This porous medium is of low density.

Moreover, the molding tool that gives the shape of the damping device 8 also acts on the material density. In the area close to the molding tool, fewer cavities are generated. The material is then less porous on its outside periphery and its density is higher than the density of the inner body. The portion of higher density is located on the outside of a portion of lower density; they define an outer skinny layer and an inner foam body respectively.

According to an embodiment, the resilient material of the damping device 8 is molten in its preformed state with a material being expandable under heat treatment.

The expandable material consists in a plurality of spheres comprising each a shell and a gas encapsulated within the shell. When the molten material is molded, the gas internal pressure increases under heat treatment and the shell is then plastically deformed.

According to another embodiment, the resilient material of the damping device is molten in its preformed state directly with injected gas. The gas is injected in the hot material just before being injected for molding the damping device 8.

Advantageously, the quantity of injected gas, directly or indirectly via the expandable material, can be adjusted for precisely defining the density of the foam body 84.

Advantageously, the temperature of the molding tool can be adjusted so as to precisely define the density of the skinny layer 85. More precisely, the molding tool can be cooled off during the molding process so as to increase the density of the outer periphery of the damping device 8.

Inner sealing means 6 are provided between an inner periphery of the radial portion 43 of the lower cap 4 and the inner skirt 31 of the upper cap 3. Outer sealing means 7 are provided between an outer periphery of the radial portion 43 of the lower cap 4 and the outer skirt 32 of the upper cap 3.

The invention claimed is:

1. A suspension thrust bearing used in conjunction with a suspension spring in an automotive suspension strut, comprising:
    a bearing with an annular upper part and a annular lower part in relative rotation to one another;
    a lower support surface comprised by the lower part that axially supports an upper end of a suspension spring by the intermediate of a damping device made from resilient material; wherein
    the resilient material of the damping device is molten in a preformed state with gas and, after being molded, the molten material of the damping device comprises an outer layer and an inner foam body, the density of the outer layer being greater than the density of the inner foam body.

2. The suspension thrust bearing according to claim 1, wherein the lower part comprises an axial hub and an outwardly projected radial flange extending from the hub.

3. The suspension thrust bearing according to the claim 2, wherein a damping device is comprised by an outer cylindrical surface of the hub so as to support radial load from the suspension spring.

4. The suspension thrust bearing according to claim 2, wherein a damping device is comprised by a lower radial surface of the outwardly projected radial flange so as to support axial load from the suspension spring.

5. The suspension thrust bearing according to claim 1, wherein the resilient material of the damping device is molten in the preformed state with a material being expandable under heat treatment.

6. The suspension thrust bearing according to the claim 5, wherein the expandable material consists of a plurality of spheres, each sphere comprising a shell and a gas encapsulated within the shell, the gas internal pressure increasing under heat treatment and the shell being then plastically deformed.

7. The suspension thrust bearing according to claim 1, wherein the resilient material of the damping device is molten in the preformed state directly with injected gas.

* * * * *